US012694548B2

(12) United States Patent
Gurrapu et al.

(10) Patent No.: US 12,694,548 B2
(45) Date of Patent: Jul. 28, 2026

(54) STRUCTURED LIGHT PROJECTOR

(71) Applicant: Texas Instruments Incorporated,
Dallas, TX (US)

(72) Inventors: Srikanth Gurrapu, Frisco, TX (US);
Yangxi Wang, Plano, TX (US);
Zhongyan Sheng, Allen, TX (US)

(73) Assignee: Texas Instruments Incorporated,
Dallas, TX (US)

( * ) Notice: Subject to any disclaimer, the term of this
patent is extended or adjusted under 35
U.S.C. 154(b) by 0 days.

(21) Appl. No.: 18/826,554

(22) Filed: Sep. 6, 2024

(65) Prior Publication Data
US 2024/0428434 A1 Dec. 26, 2024

Related U.S. Application Data

(63) Continuation of application No. 16/213,634, filed on
Dec. 7, 2018, now Pat. No. 12,112,493.

(51) Int. Cl.
| | |
|---|---|
| *G06T 7/521* | (2017.01) |
| *G03B 21/00* | (2006.01) |
| *G06T 7/70* | (2017.01) |

(52) U.S. Cl.
CPC ............ *G06T 7/521* (2017.01); *G03B 21/008*
(2013.01); *G06T 7/70* (2017.01); *G06T*
*2207/10028* (2013.01)

(58) Field of Classification Search
CPC .................................................... G06T 7/521
See application file for complete search history.

(56) References Cited

U.S. PATENT DOCUMENTS

| | | | |
|---|---|---|---|
| 9,325,973 B1* | 4/2016 | Hazeghi | H04N 13/296 |
| 10,466,360 B1 | 11/2019 | Bardagjy | |
| 2004/0005113 A1* | 1/2004 | Noonan | G02B 6/3516 385/17 |
| 2009/0032692 A1* | 2/2009 | Hsu | G02B 21/32 359/558 |
| 2010/0074532 A1 | 3/2010 | Gordon | |

(Continued)

OTHER PUBLICATIONS

Geng, "Structured-light 3D surface imaging: a tutorial," Advances
in Optics and Photonics 3, 128-160 (2011), doi: 10.1364/AOP.3.
000128, OSA-The Optical Society, 2010 Massachusetts Ave., N.W.,
Washington, D.C. 20036-1012, retrieved from https://www.
osapublishing.org/aop/fulltext.cfm?uri=aop-3-2-128 id=211561 on Dec.
5, 2018.

*Primary Examiner* — Jayanti K Patel
*Assistant Examiner* — Christopher Kingsbury Glover
(74) *Attorney, Agent, or Firm* — Michael T. Gabrik;
Frank D. Cimino

(57) ABSTRACT

Described examples include an apparatus includes a spatial
light modulator configured to receive input light; and modu-
late the input light, to produce modulated light, where the
modulated light has a pixel pattern of dark pixels and bright
pixels. The apparatus also includes a diffractive optical
element optically coupled to the spatial light modulator, the
diffractive optical element configured to: receive the modu-
lated light; and modulate the pixel pattern of dark pixels and
bright pixels, to produce a structured light pattern, the
structured light pattern having dark regions and bright
regions, the bright regions each having the pixel pattern of
dark pixels and bright pixels.

20 Claims, 8 Drawing Sheets

(56) References Cited

U.S. PATENT DOCUMENTS

| | | | |
|---|---|---|---|
| 2015/0292863 A1 | 10/2015 | Furihata | |
| 2016/0197452 A1 | 7/2016 | Mor | |
| 2018/0048880 A1 | 2/2018 | Trail | |
| 2018/0217234 A1 | 8/2018 | Skowronek | |
| 2019/0219696 A1* | 7/2019 | Xu | G01S 7/4915 |

* cited by examiner

702

704

802

804

$\cdots (\log_2 N) \cdots$

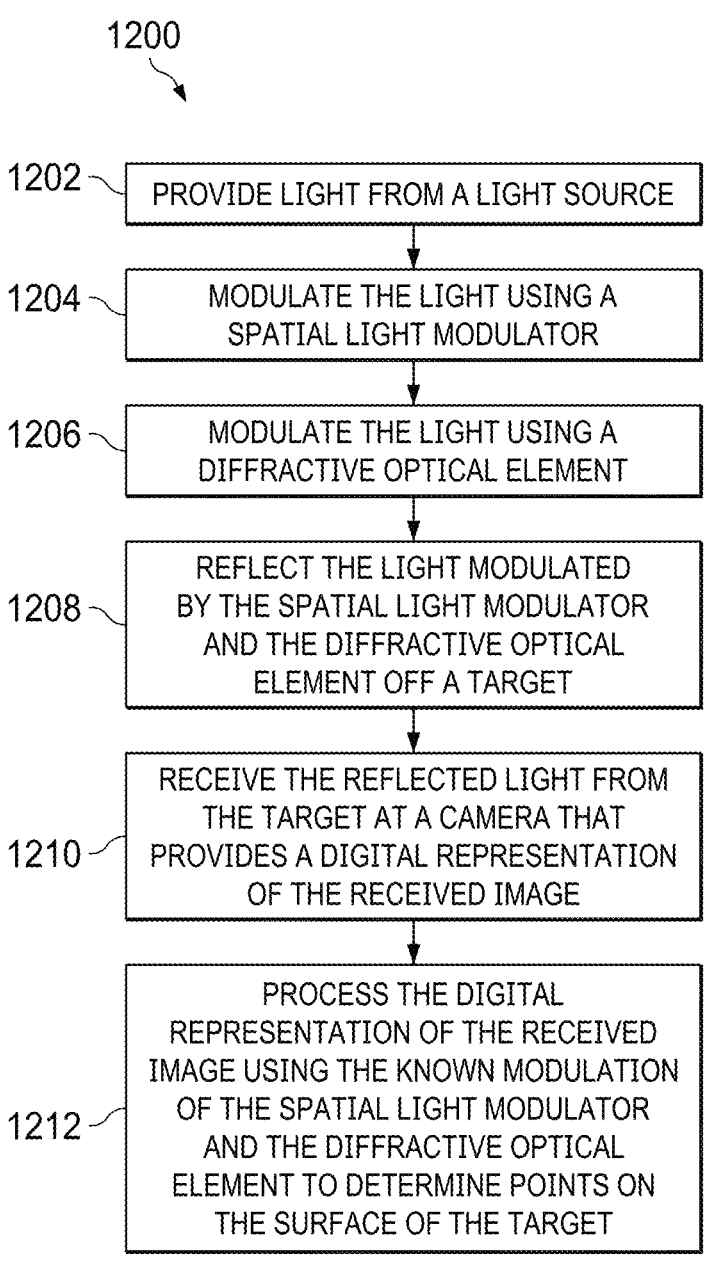

1200

1202 — PROVIDE LIGHT FROM A LIGHT SOURCE

1204 — MODULATE THE LIGHT USING A SPATIAL LIGHT MODULATOR

1206 — MODULATE THE LIGHT USING A DIFFRACTIVE OPTICAL ELEMENT

1208 — REFLECT THE LIGHT MODULATED BY THE SPATIAL LIGHT MODULATOR AND THE DIFFRACTIVE OPTICAL ELEMENT OFF A TARGET

1210 — RECEIVE THE REFLECTED LIGHT FROM THE TARGET AT A CAMERA THAT PROVIDES A DIGITAL REPRESENTATION OF THE RECEIVED IMAGE

1212 — PROCESS THE DIGITAL REPRESENTATION OF THE RECEIVED IMAGE USING THE KNOWN MODULATION OF THE SPATIAL LIGHT MODULATOR AND THE DIFFRACTIVE OPTICAL ELEMENT TO DETERMINE POINTS ON THE SURFACE OF THE TARGET

FIG. 12

STRUCTURED LIGHT PROJECTOR

CROSS-REFERENCE TO RELATED APPLICATIONS

This Application is a continuation of prior application Ser. No. 16/213,634, filed Dec. 18, 2018, and scheduled to grant as U.S. Pat. No. 11,808,810 on Nov. 7, 2023, which Application is hereby incorporated herein by reference in its entirety.

TECHNICAL FIELD

This relates generally to projection of light patterns and more particularly to projection of structured light.

BACKGROUND

Structured light is a technique for capturing a 3D digital representation of an object in very high resolution. A structured light source projects light patterns, for example a series of stripes, onto the object. A light source modulated by a spatial light modulator (SLM) or a diffractive optical element (DOE) may provide the structured light patterns. This light pattern is distorted by the object according to its 3D shape. A sensor or sensor array captures the structured light reflected off the object. Epipolar geometry, such as triangulation, determines a three-dimensional point location for the points in the portion of the object illuminated by the structured light from the distortions to the reflected image caused by the object. This process can be repeated to more fully image the object. The precision of the depth map of the object is a function of the pixel density of the projected light structure, camera (sensor array) resolution, projector field of view (FOV), camera FOV, and distance between camera and projector (baseline). The resolution of the sensor array and/or the resolution of the structured light, limits, in part, the accuracy of the three-dimensional image. Higher resolution light structure and/or sensor may provide more accurate images. However, the cost of the sensors, spatial light modulators, diffractive optical elements, associated optics and associated circuitry rises geometrically with the resolution.

SUMMARY

In accordance with an example, an apparatus includes a spatial light modulator configured to receive input light; and modulate the input light, to produce modulated light, where the modulated light has a pixel pattern of dark pixels and bright pixels. The apparatus also includes a diffractive optical element optically coupled to the spatial light modulator, the diffractive optical element configured to: receive the modulated light; and modulate the pixel pattern of dark pixels and bright pixels, to produce a structured light pattern, the structured light pattern having dark regions and bright regions, the bright regions each having the pixel pattern of dark pixels and bright pixels.

In accordance with an example, an apparatus includes a spatial light modulator configured to produce first modulated light responsive to receiving input light, where the first modulated light has a pixel pattern of dark pixels and bright pixels. The apparatus also includes a diffractive optical element configured to modulate the pixel pattern of dark pixels and bright pixels, to produce second modulated light, the second modulated light having dark regions and bright regions, the bright regions each having the pixel pattern of dark pixels and bright pixels. The apparatus includes a controller coupled to the spatial light modulator. Additionally, the apparatus includes projection optics optically coupled to the diffractive optical element, the projection optics configured to project the second modulated light, to produce projected light and a camera configured to receive an image of a reflection of the second modulated light. Also, the apparatus includes a processor coupled to the controller and to the camera, the processor configured to: process the image, to produce a processed image and instruct the controller to control the spatial light modulator, based on the processed image.

In accordance with an example, a method includes receiving, by a spatial light modulator, input light and modulating, by the spatial light modulator, the input light, to produce modulated light, where the modulated light has a pixel pattern of dark pixels and bright pixels. The method also includes receiving, by a diffractive optical element, the modulated light and modulating, by the diffractive optical element, the pixel pattern of dark pixels and bright pixels, to produce a structured light pattern, the structured light pattern having dark regions and bright regions, the bright regions each having the pixel pattern of dark pixels and bright pixels.

BRIEF DESCRIPTION OF THE DRAWINGS

FIG. 12 is a flow diagram of an example method.

DETAILED DESCRIPTION

Corresponding numerals and symbols in the different figures generally refer to corresponding parts unless otherwise indicated. The figures are not necessarily drawn to scale.

The term "coupled" may include connections made with intervening elements, and additional elements and various connections may exist between any elements that are "coupled."

Figure 1:
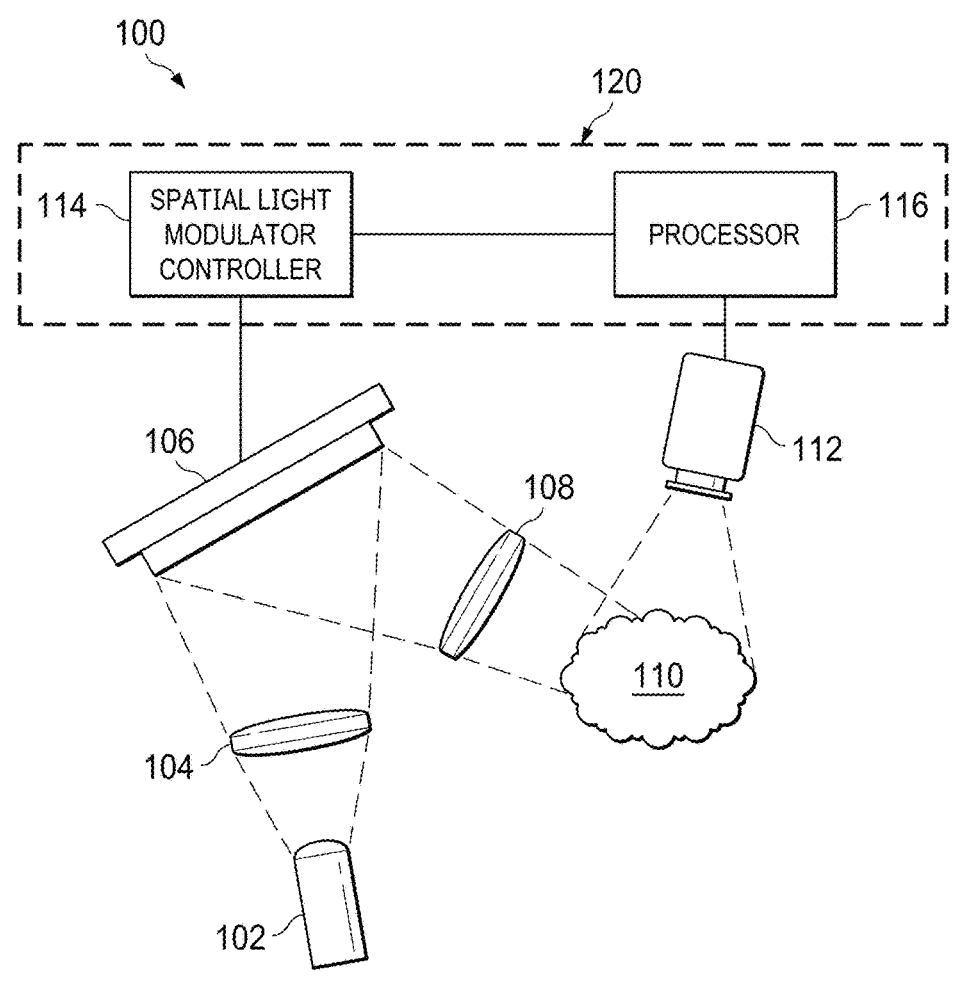
FIG. 1 is a schematic drawing of an example structured-light imaging device.

FIG. 1 shows an example structured-light imaging device 100. Lens 104 focuses light from light source 102 onto spatial light modulator (SLM) 106. Lenses herein may be one lens or a multi-lens system. An example spatial light modulator 106 is a digital micromirror device (DMD) such as those available from Texas Instruments Incorporated. Spatial light modulator 106 directs selected pixels of light from lens 104 in the form of the light structure. Stripes are one form of structured light. In some examples, spatial light modulator 106 produces many other example light structures, some of which are described in Geng, "Structured-light 3D Surface Imaging: a Tutorial," Advances in Optics and Photonics 3, 128-160 (2011), which is incorporated herein by reference. Lens 108 focuses the structured light onto object 110. Sensor (camera) 112 receives the reflection of the structured light from object 110 to provide a sensed image. In this example, sensor 112 is a charge-coupled device (CCD) or complementary metal-oxide semiconductor (CMOS) based array of optical sensors. Processor 116 receives the data for the sensed image from sensor 112. Processor 116 controls controller circuitry 114, which controls spatial light modulator 106. Processor 116 instructs controller circuitry 114 so that spatial light modulator 106 produces the structure of light selected by processor 116. Therefore, processor 116 knows the configuration of the structured light. There is a positional relationship between spatial light modulator 106 and sensor 112. Therefore, using epipolar analysis techniques like triangulation, processor 116 determines the three-dimensional position in space on the object of each pixel of the structured light that illuminates the object. In this example, processor 116 can repeat the process using different structured light to determine all points on the surface of object 110. In an example, processor 116 and controller circuitry 114 are separate integrated circuits. In an alternative example processor 116 and controller circuitry 114 are on one combined integrated circuit 120. In additional examples, processor 116 and controller circuitry 114 are in a hybrid package including the components in combinations of integrated circuits. Processor 116 can be, as examples, one of: a microprocessor, a microcontroller, a digital signal processor (DSP), an application specific integrated circuit (ASIC), a field programmable gate array (FPGA) or other suitable processing device.

Figure 2:
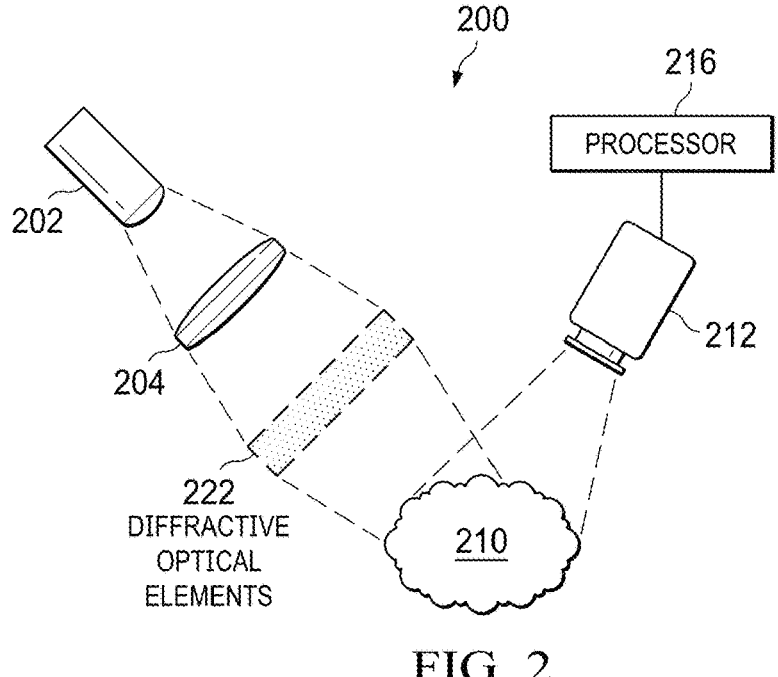
FIG. 2 is a schematic drawing of another example structured light imaging device 200.

FIG. 2 shows another example structured light imaging device 200. Components numbered similarly to those in FIG. 1 perform similar functions. For example, light source 202, lens 204, sensor 212 and processor 216 perform similar functions to light source 102, lens 104, sensor 112 and processor 116. In structured light imaging device 200, diffractive optical element 222 replaces spatial light modulator 106 (FIG. 1). Light from light source 202 passes through diffractive optical element 222, which includes a permanently formed light structure. Diffractive optical elements with customer specified light structures are commercially available from manufacturers, such as HOLO/OR Ltd. of Rehovot, Israel. Sensor 212 receives the light reflected from object 210 and provides that image to processor 216. Processor 216 includes a copy of the light structure formed in diffractive optical element 222 and uses that information to determine three-dimensional points on the surface of object 210, as further explained hereinbelow.

Figure 3:
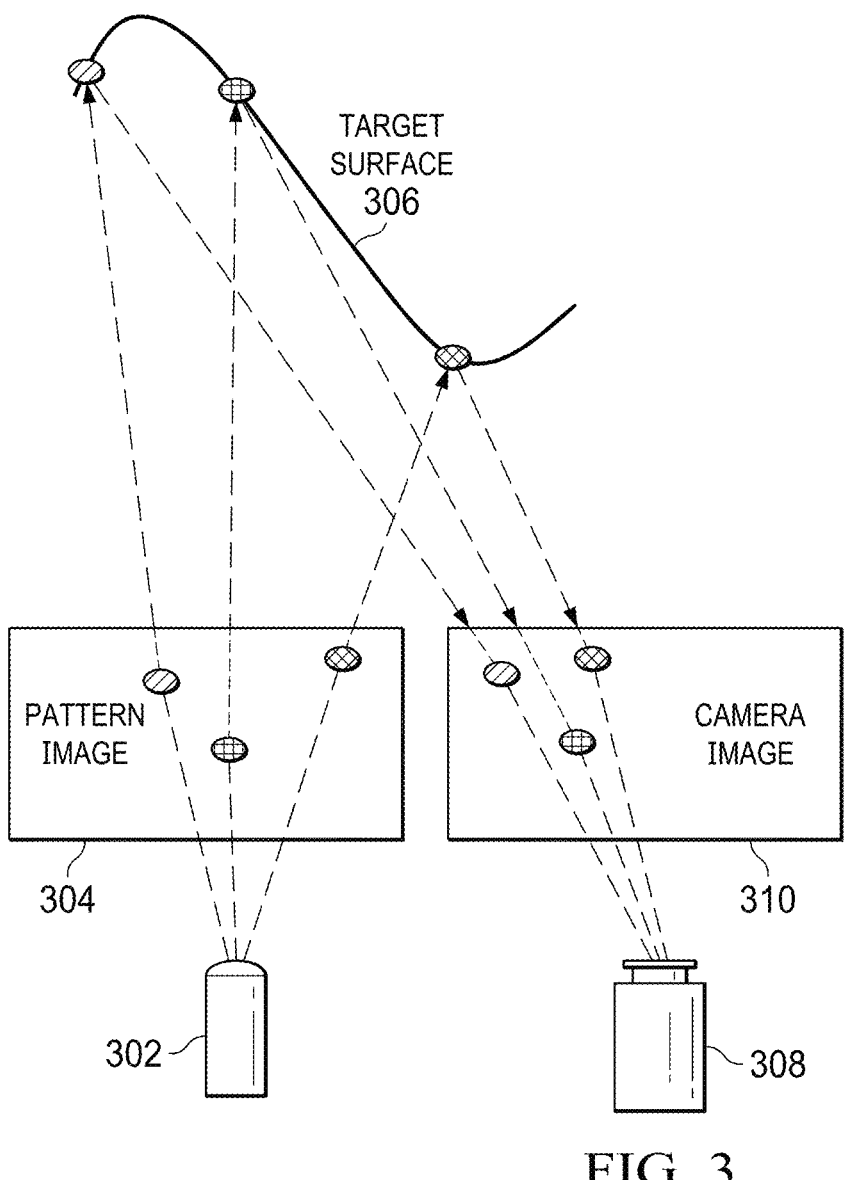
FIG. 3 is a drawing showing an example process of capturing a three-dimensional image.

FIG. 3 shows schematically an example process of capturing a three-dimensional image. Projector 302 projects pattern image 304 onto the surface of the target 306. The pattern image 304 reflects from target 306 at different points as shown in FIG. 3. A known distance separates camera 308 and projector 302. This separation changes the perspective of the received camera image 310 and thus shifts the positions of the received pattern.

Figure 4:
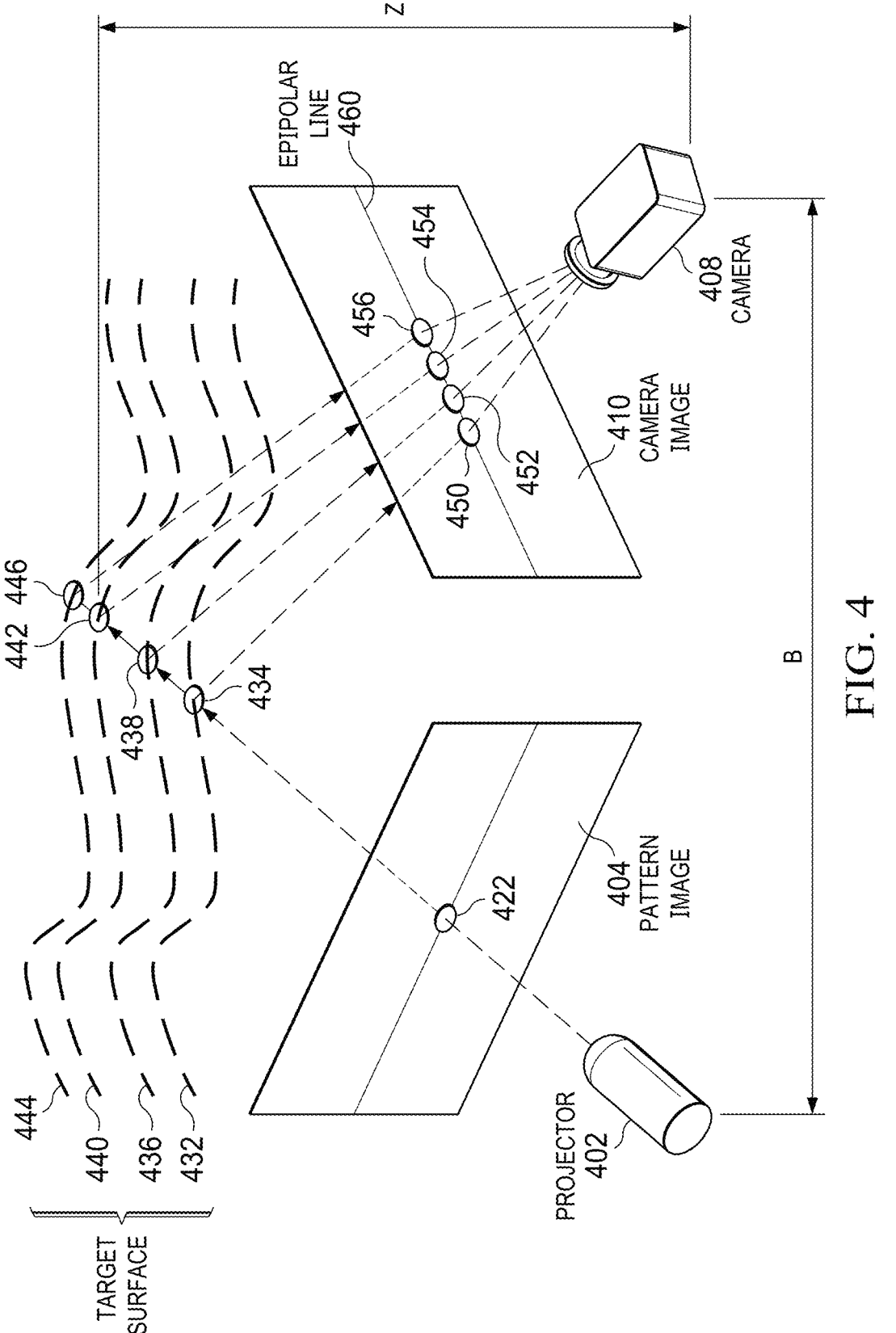
FIG. 4 is a drawing showing shifting of the received structured light for different target surfaces.

FIG. 4 shows shifting of the received structured light for different target surfaces. Projector 402 provides pattern image 404. For simplicity, pattern image 404 only includes one light point 422. However, a typical structured light image will include a thousand or more light points. FIG. 4 includes four example target surfaces. In FIG. 4, light point 422 strikes target surface 432 at point 434, strikes target surface 436 at point 438, strikes target surface 440 at point 442 or strikes target surface 444 at point 446. In this example, only one target is measured at a time. Four targets are shown in FIG. 4 to illustrate determining the depth of the target at different distances from the projector 402.

Camera image 410 shows that projected point 422 will produce an image at four different point positions in camera image 410 for each of the four alternate surfaces 432, 436, 440 or 444. For the depths along the Z axis of the four surfaces, point 434 will produce point 450 in camera image 410, point 438 will produce point 452 in camera image 410, point 442 will produce point 454 in camera image 410 or point 456 for point 446 in camera image 410. Points 450, 452, 454 and 456 fall along epipolar line 460. Given the known distance B between projector 402 and camera 408, the depth of the targeted surface can be determined by the position of the received point on epipolar line 460. Mathematically determining the depth with the height and width positions of the received points allows for determination of the three-dimensional position of all points on the target surface.

Figure 5:
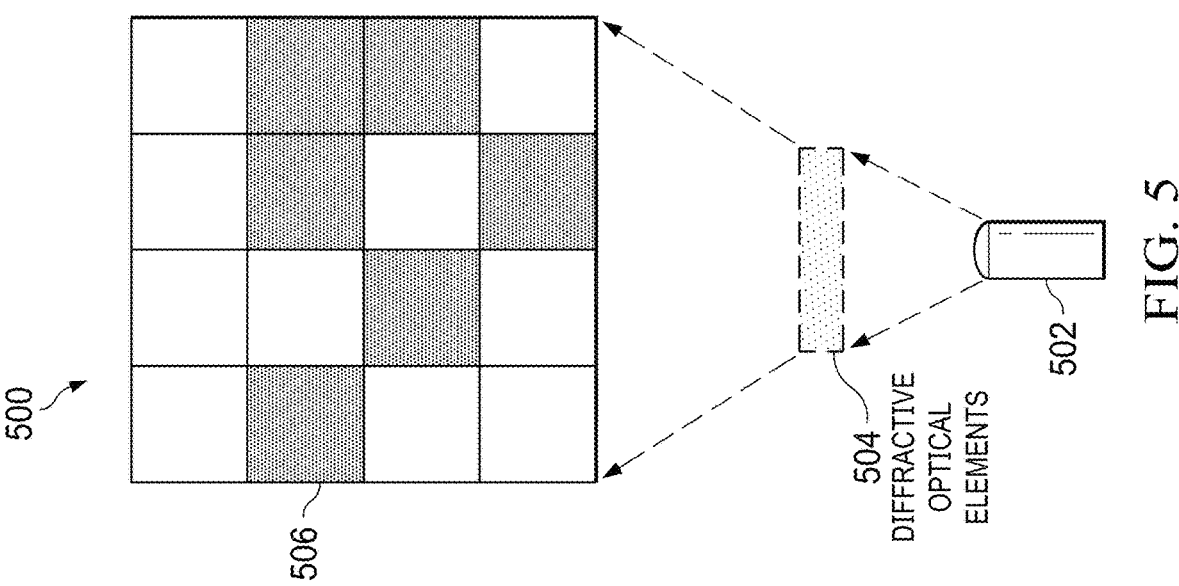
FIG. 5 is a drawing of an example light structure projector.

FIG. 5 shows an example light structure projector 500. Light source 502 sends light through diffractive optical element 504. In this example, pattern 506 is a regular four by four matrix. Practical examples may include a thousand pixels or more. In this example, the pattern in diffractive optical element 504 directs light from light source 502 away from the first, third and fourth pixels of the second row of pattern 506. It also directs light away from the second and fourth pixels of the third row and the third pixel of the fourth row. Light source 502 illuminates all other pixels in pattern 506. Pattern 506 is an example and any desired pattern may be used.

Figure 6:
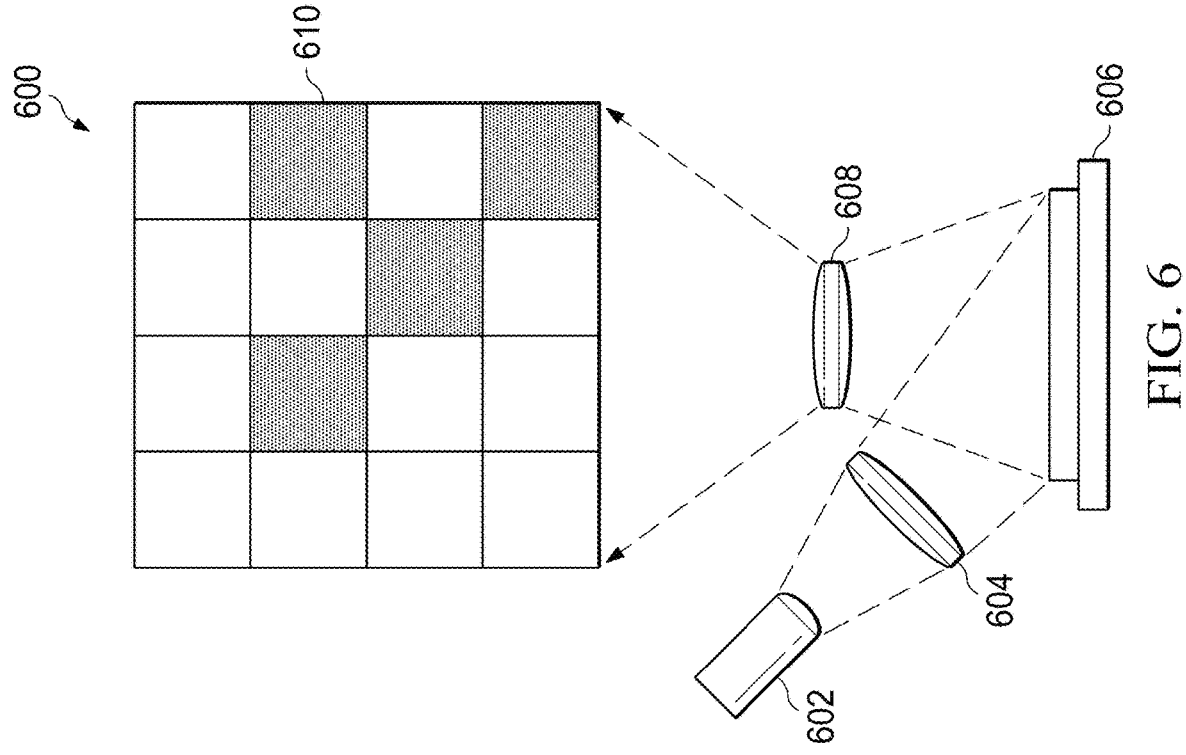
FIG. 6 is a drawing of an example light structure projector using a spatial light modulator.

FIG. 6 shows an example light structure projector 600 using a spatial light modulator. Light source 602 sends light through lens 604 to spatial light modulator 606. In this example, spatial light modulator 606 is a digital micromirror device. Spatial light modulator 606 includes, for example, thousands of individually addressable mirrors. A controller circuitry (not shown), determines which mirrors reflect light from light source 602 to lens 608 and which mirrors reflect light away from lens 608. Pattern 610 shows a simplified four by four array. In this example, the light from the second and fourth mirrors in the second row, the third mirror in the third row and the fourth mirror in the fourth row is directed away from lens 608.

Figure 7:
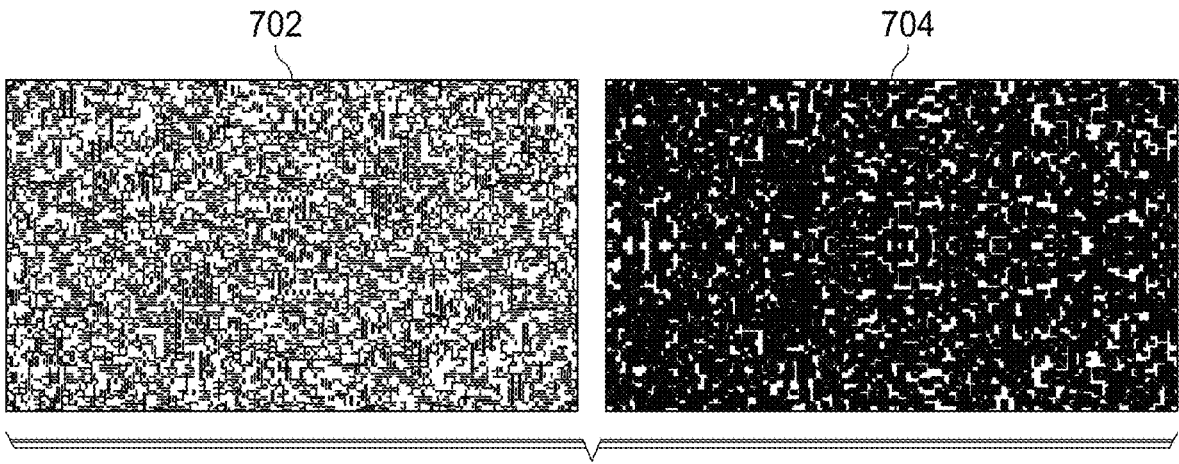
FIG. 7 is a drawing of two example structured light patterns.

FIG. 7 shows two example structured light patterns useful with projector 500 (FIG. 5). Because the structured light pattern formed in diffractive optical element 504 (FIG. 5) is fixed, highly randomized structured light patterns are used to increase the surface position accuracy. Structured light pattern 702 is an example highly randomized pattern with an approximate 50%/50% split between light and dark pixels. Structured light pattern 704 has far more dark than light pixels. The pattern chosen is generally optimized for each application.

Figure 8:
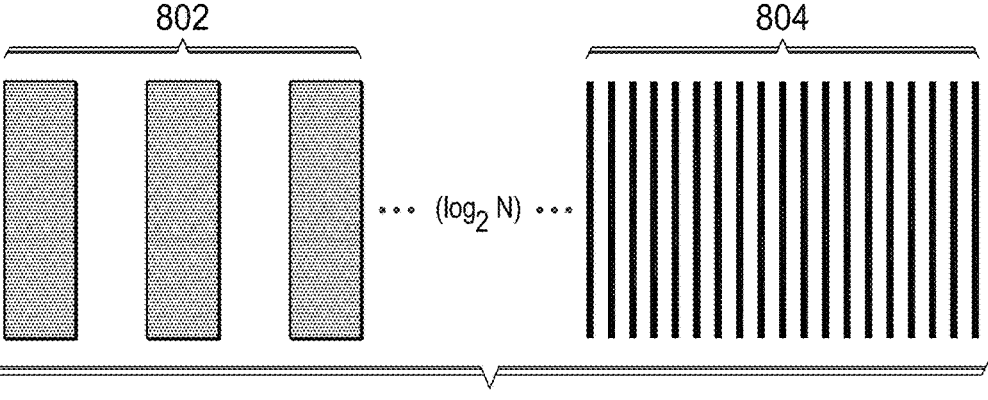
FIG. 8 is a drawing of an example striped structured light pattern.

FIG. 8 shows an example striped structured light pattern for use with projector 600 (FIG. 6). Because projector 600 (FIG. 6) uses spatial light modulator 606 (FIG. 6), the projected structured light can be modified. In an example, a striped pattern like pattern 802 may be projected at one time. Subsequently projected patterns would have a denser stripe pattern with the number of stripes increasing by $\log_2$ N, where N is the number of the iterations of projected stripes. A final pattern 804 is selected based on the resolution of spatial light modulator 606 (FIG. 6) and timing consider- ations. Using a series of projected patterns allows for more accuracy but may be slower and may be limited by the resolution of the spatial light modulator.

Figures 9, 10:
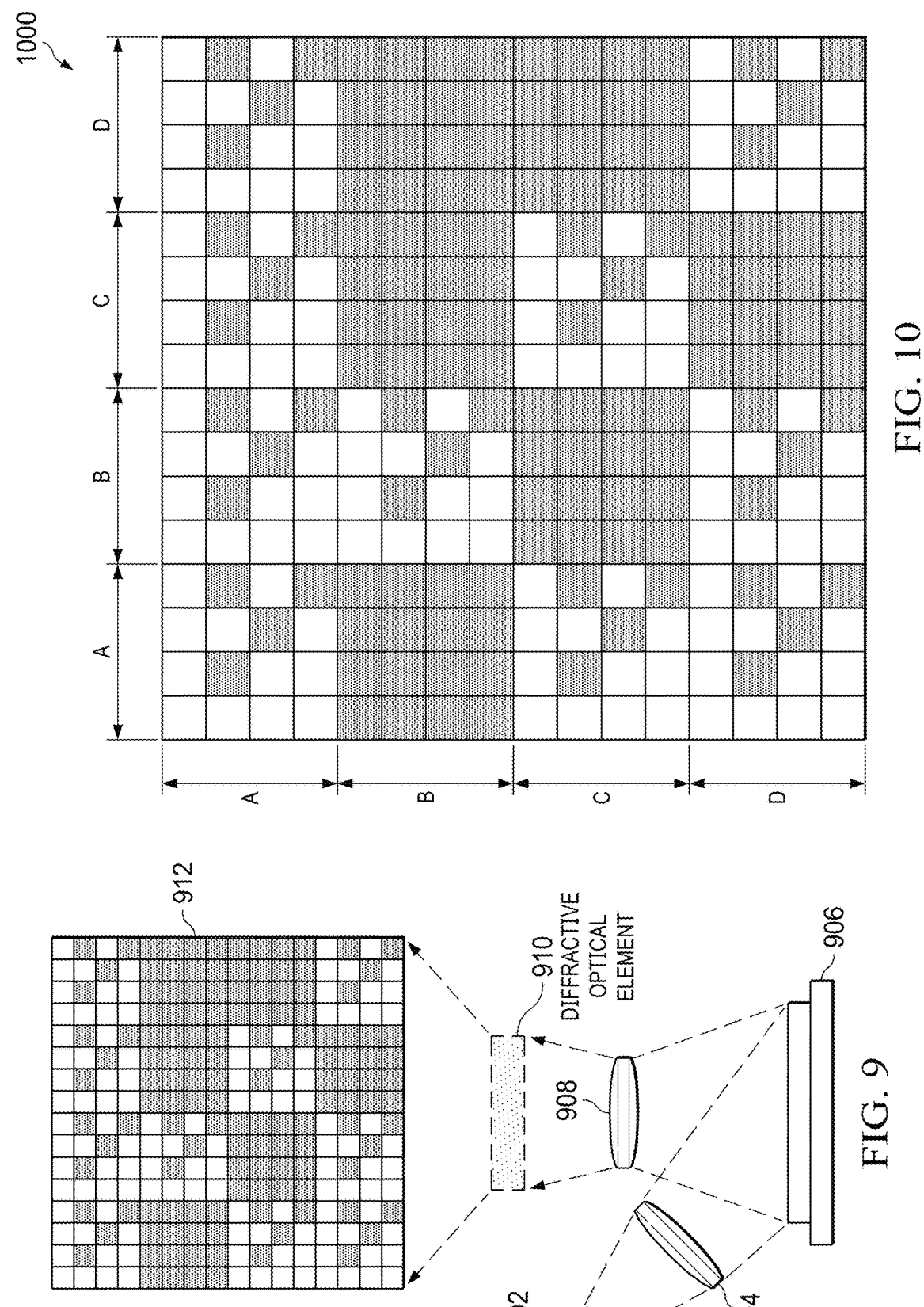
FIG. 9 is a schematic drawing of an example structured light projector.
FIG. 10 is drawing of an example structured light pattern.

FIG. 9 shows an example structured light projector 900. Light source 902 provides light through lens 904 to spatial light modulator 906. Spatial light modulator 906 modulates the light and provides the modulated light to diffractive optical element 910 through lens 908. The resulting pattern is structured light 912. For simplicity of explanation, spatial light modulator 906 modulates the light in pattern 506 (FIG. 5) and diffractive optical element modulates the light received from spatial light modulator 906 in pattern 610 (FIG. 6). The pattern modulated by spatial light modulator 906 is the image provided to diffractive optical element 910. The pixels of diffractive optical element 910 that transmit the light are lenses that transmit the image received from spatial light modulator 906. Therefore, each of these pixels includes pattern 506 (FIG. 5) as further explained herein- below.

FIG. 10 shows an example structured light pattern 1000, which is like structured light 912 of (FIG. 9). Each column is labeled A-D and each row is labeled A-D to allow for convenient identification of the pixels of the pattern as the row letter followed by the column letter of diffractive optical element 910 (FIG. 9). In the pattern shown, diffractive optical element 910 (FIG. 9) passes the image received by diffractive optical element 910 (FIG. 9) at pixels AA, AB, AC, AD, BB, CA, CC, DA, DB and DD. Therefore, dif- fractive optical element 910 (FIG. 9) blocks the image received at pixels BA, BC, BD, CB, CD and DC. Of note, in the example of FIG. 10, every pixel transmitted by diffractive optical element 910 (FIG. 9) includes the pixels of the light as modulated by spatial light modulator 906 (FIG. 9), which includes sixteen pixels. Thus, in the highly simplified example of FIGS. 9 and 10, projector 900 is theoretically capable of providing a pattern having 16×16=256 pixels. In a more practical example, diffractive optical element 910 (FIG. 9) and spatial light modulator 906 (FIG. 9) may have, for example, one-thousand pixels each. Such devices would have a relatively low resolution, and thus be low-cost devices. However, the example of FIG. 9 allows these low-cost devices to produce a pattern having a maximum resolution of 1,000×1,000=1 Million pixels. A single spatial light modulator or diffractive optical element capable of IM pixel resolution is large and expensive. In addition to providing high resolution patterns, projector 900 (FIG. 9) has some flexibility in modifying the projected pattern because spatial light modulator can change its modu- lation.

In other examples, the pattern generated by the DOE (FIG. 5) and the pattern generated by the projector (FIG. 6) is not orthogonally arrayed like the ones shown in FIGS. 5-10. For example, adding shift between the columns in FIG. 5 achieves long range randomness along epipolar line which is highly desirable for some depth calculation algorithms.

Figure 11:
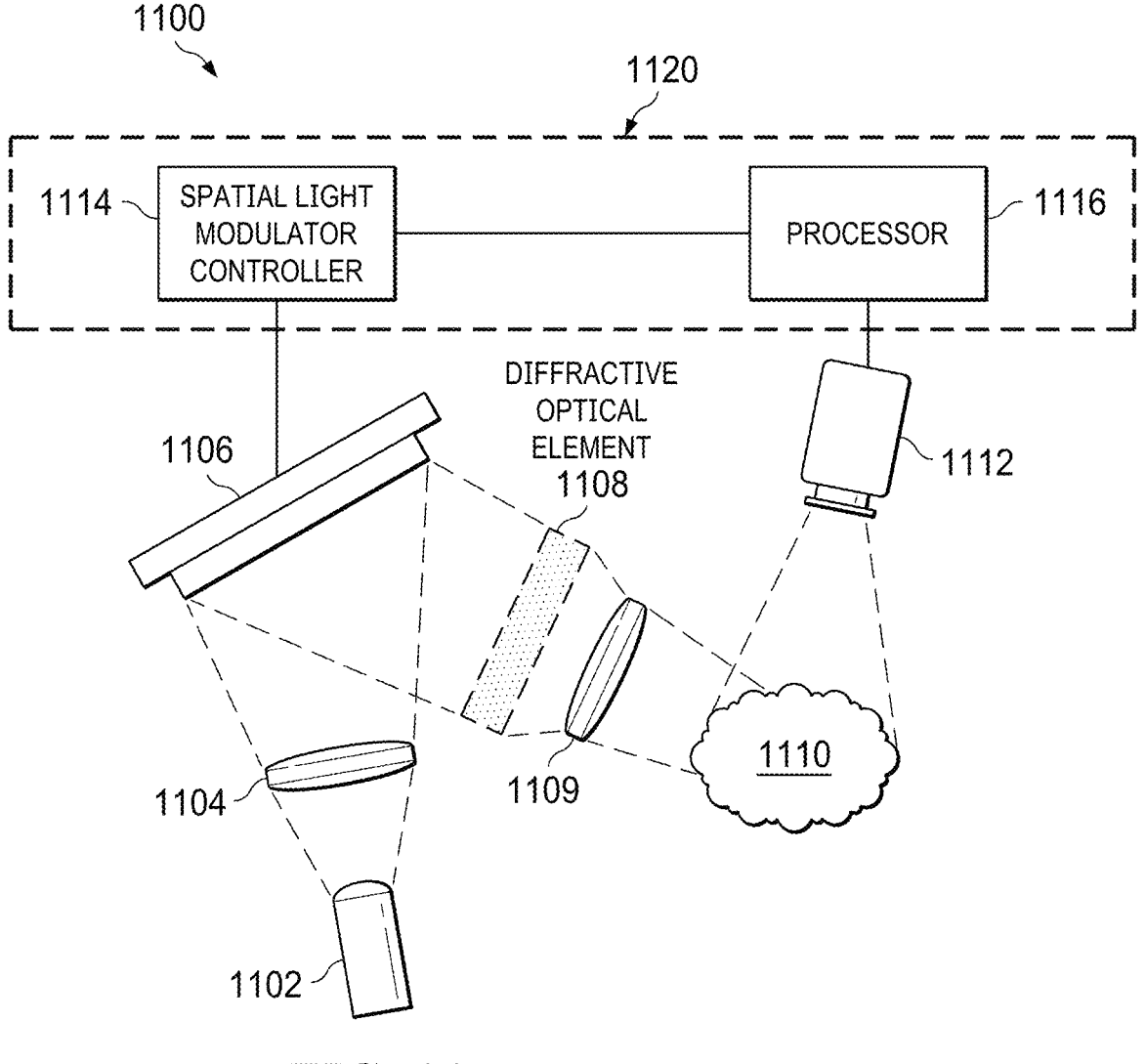
FIG. 11 is a schematic drawing of an example structured-light imaging device.

FIG. 11 shows an example structured-light imaging device 1100. Lens 1104 focuses light from light source 1102 onto spatial light modulator 1106. In an example, light source 1102 is a laser diode and may provide light in the visible, infrared or ultraviolet spectrums. Lenses herein may be one lens or a multi-lens system. An example spatial light modulator 1106 is a digital micromirror device (DMD) such as those available from Texas Instruments Incorporated. Spatial light modulator 1106 directs selected pixels of light from lens 1104 in the form of the light structure. Diffractive optical element 1108 further modulates the light from spatial light modulator 1106 in the manner explained hereinabove regarding FIGS. 9 and 10. Projection optics 1109 directs the light modulated by spatial light modulator 1106 and diffrac- tive optical element 1108 onto object 1110. In another example, light from light source 1102 is first directed to diffractive optical element 1108. The light is then directed using, for example, a fly's eye array (not shown) such that the image output from diffractive optical element is focused onto separate mirrors of spatial light modulator 1106, which then further modulates the light. In another example, dif- fractive optical element 1108 may be a number of serial diffractive optical elements.

Sensor (camera) 1112 receives the reflection of the struc- tured light from object 1110 to provide a sensed image. In this example, sensor 1112 is tuned to the type of light provided by light source 1102 and may be a charge-coupled device (CCD) or complementary metal-oxide semiconduc- tor (CMOS) based array of optical sensors. Processor 1116 receives the data for the sensed image from sensor 1112. Processor 1116 controls controller circuitry 1114, which controls spatial light modulator 1106. Processor 1116 instructs controller circuitry 1114 so that spatial light modu- lator 1106 produces the structure of light selected by pro- cessor 1116. Therefore, processor 1116 knows the configu- ration of the structured light. Using epipolar analysis, processor 1116 determines the three-dimensional position in space on object 1110 of each pixel of the structured light that illuminates object 1110. In this example, processor 1116 can repeat the process using different structured light to more accurately determine all points on the surface of object 1110. In an example, processor 1116 and controller circuitry 1114 are separate integrated circuits. In an alternative example processor 1116 and controller circuitry 1114 are on one combined integrated circuit 1120. In additional examples, processor 1116 and controller circuitry 1114 are in a hybrid package including the components in combinations of inte- grated circuits. Processor 1116 can be, for example, imple- mented using one of: a microprocessor, a microcontroller, a digital signal processor (DSP), an application specific inte- grated circuit (ASIC), a field programmable gate array (FPGA) or other suitable processing device. Structured-light imaging device 1100 may be useful in identifying objects in an industrial process, inventory management, face recogni- tion, other biometric recognition and autonomous vehicles, among other applications.

FIG. 12 is a flow diagram of an example method 1200. At step 1202, light is provided from a light source such as light source 1102 (FIG. 11). At step 1204 the light provided by the light source is modulated using a spatial light modulator such as spatial light modulator 1106 (FIG. 11). At step 1206, the light is again modulated using a diffractive optical element such as diffractive optical element 1108 (FIG. 11). At step 1208, a target object reflects the light modulated by the spatial light modulator and the diffractive optical ele- ment, such as object 1110 (FIG. 11). At step 1210, the reflected light from the target is received at a camera such as sensor 1112 (FIG. 11), the reflected light enables the system to provide a digital representation of the received reflected light. At step 1212, the received reflected light is processed using a processor such as processor 1116 (FIG. 11) to determine the points on the surface of the target. 3-D imaging or position detection can be performed using the reflected light from the target.

Modifications are possible in the described examples, and other examples are possible, within the scope of the claims.

What is claimed is:

1. An apparatus comprising:

a spatial light modulator configured to:

receive input light; and modulate the input light, to produce modulated light, wherein the modulated light has a pixel pattern of dark pixels and bright pixels; and a diffractive optical element configured to:

receive the modulated light; and modulate the pixel pattern of dark pixels and bright pixels, to produce a structured light pattern, the structured light pattern having dark regions and bright regions, the bright regions each having the pixel pattern of dark pixels and bright pixels.

2. The apparatus of claim 1, further comprising a lens configured to focus the pixel pattern of dark pixels and bright pixels towards the diffractive optical element.

3. The apparatus of claim 1, further comprising a light source configured to produce the input light.

4. The apparatus of claim 3, further comprising a lens configured to direct the input light from the light source to the spatial light modulator.

5. The apparatus of claim 1, further comprising projection optics configured to project the structured light pattern, to produce projected light.

6. The apparatus of claim 5, further comprising:

a camera configured to receive a reflection of the projected light; and a processor coupled to the camera, the processor configured to determine a digital representation of a target surface based on the reflection of the projected light.

7. The apparatus of claim 6, further comprising a controller coupled to the processor and to the spatial light modulator.

8. The apparatus of claim 7, wherein the controller is configured to vary modulation of the spatial light modulator.

9. The apparatus of claim 6, wherein the processor is configured to determine the digital representation of the target surface using epipolar analysis.

10. An apparatus comprising:

a spatial light modulator configured to produce first modulated light responsive to receiving input light, wherein the first modulated light has a pixel pattern of dark pixels and bright pixels;

a diffractive optical element configured to modulate the pixel pattern of dark pixels and bright pixels, to produce second modulated light, the second modulated light having dark regions and bright regions, the bright regions each having the pixel pattern of dark pixels and bright pixels;

a controller coupled to the spatial light modulator;

projection optics configured to project the second modulated light, to produce projected light;

a camera configured to receive an image of a reflection of the second modulated light; and a processor coupled to the controller and to the camera, the processor configured to:

process the image, to produce a processed image; and instruct the controller to control the spatial light modulator, based on the processed image.

11. The apparatus of claim 10, further comprising a lens configured to focus the pixel pattern of dark pixels and bright pixels towards the diffractive optical element.

12. The apparatus of claim 10, wherein the processor and the controller are an integrated circuit.

13. The apparatus of claim 10, wherein the controller is configured to instruct the spatial light modulator to vary modulation of the second modulated light.

14. The apparatus of claim 10, wherein the processor is further configured to determine a digital representation of a target surface using epipolar analysis.

15. The apparatus of claim 10, further comprising a light source configured to produce the input light.

16. The apparatus of claim 15, further comprising a lens configured to direct the input light from the light source to the spatial light modulator.

17. A method comprising:

receiving, by a spatial light modulator, input light;

modulating, by the spatial light modulator, the input light, to produce modulated light, wherein the modulated light has a pixel pattern of dark pixels and bright pixels;

receiving, by a diffractive optical element, the modulated light; and modulating, by the diffractive optical element, the pixel pattern of dark pixels and bright pixels, to produce a structured light pattern, the structured light pattern having dark regions and bright regions, the bright regions each having the pixel pattern of dark pixels and bright pixels.

18. The method of claim 17, further focusing, by a lens, the pixel pattern of dark pixels and bright pixels towards the diffractive optical element.

19. The method of claim 17, further comprising instructing the spatial light modulator, by a controller, to vary modulation of the input light.

20. The method of claim 17, further comprising:

projecting, by projection optics, the structured light pattern, to produce projected light receiving, by a camera, a reflection of the projected light;

determining, by a processor, a digital representation of a target surface based on the reflection of the projected light; and determining, by the processor, the digital representation of the target surface using epipolar analysis.

* * * * *